(12) United States Patent
Fischer et al.

(10) Patent No.: US 8,223,782 B2
(45) Date of Patent: Jul. 17, 2012

(54) METHOD AND PROCEDURES FOR RADIO BEARER SETUP

(75) Inventors: Patrick Fischer, Bourg la Reine (FR); Remi Feuillette, Paris (FR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 12/598,411

(22) PCT Filed: Apr. 30, 2008

(86) PCT No.: PCT/KR2008/002450
§ 371 (c)(1),
(2), (4) Date: Apr. 2, 2010

(87) PCT Pub. No.: WO2008/133476
PCT Pub. Date: Nov. 6, 2008

(65) Prior Publication Data
US 2010/0182963 A1   Jul. 22, 2010

Related U.S. Application Data

(60) Provisional application No. 60/915,036, filed on Apr. 30, 2007.

(51) Int. Cl.
*H04L 12/28* (2006.01)
(52) U.S. Cl. ..................................... 370/405
(58) Field of Classification Search .................. None
See application file for complete search history.

(56) References Cited

U.S. PATENT DOCUMENTS

| | | |
|---|---|---|
| 2002/0089993 A1* | 7/2002 | Suumaki et al. ............. 370/405 |
| 2006/0229102 A1 | 10/2006 | Kitazoe et al. |
| 2007/0036109 A1 | 2/2007 | Kwak et al. |
| 2009/0149170 A1* | 6/2009 | Kazmi et al. ............... 455/422.1 |
| 2009/0201864 A1* | 8/2009 | Ahluwalia .................... 370/329 |

OTHER PUBLICATIONS

3rd Generation Partnership Project (3GPP); "Technical Specification; Universal Mobile Telecommunications System (UMTS); Evolved Universal Terrestrial Radio Access (E-UTRA) and Evolved Universal Terrestrial Radio Access Network (E-UTRAN); Overall description; Stage 2 (Release 8);" Mar. 2007; ETSI TS 136 300 v8.0.0.

* cited by examiner

*Primary Examiner* — Raj Jain
(74) *Attorney, Agent, or Firm* — Lee, Hong, Degerman, Kang & Waimey

(57) ABSTRACT

A method and apparatus for optimizing the radio bearer setup procedure is provided. Downloading new default configurations allows a mobile terminal to use the default configuration as often as possible for radio bearer setup, thereby precluding the need to broadcast any pre-defined configurations, parameters and identifiers.

14 Claims, 10 Drawing Sheets

[Fig. 1]
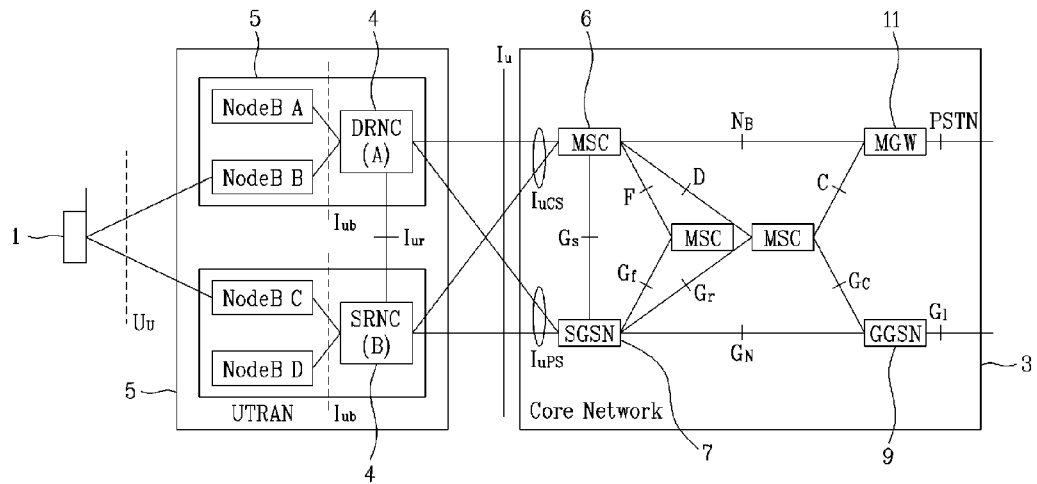
[Fig. 2]
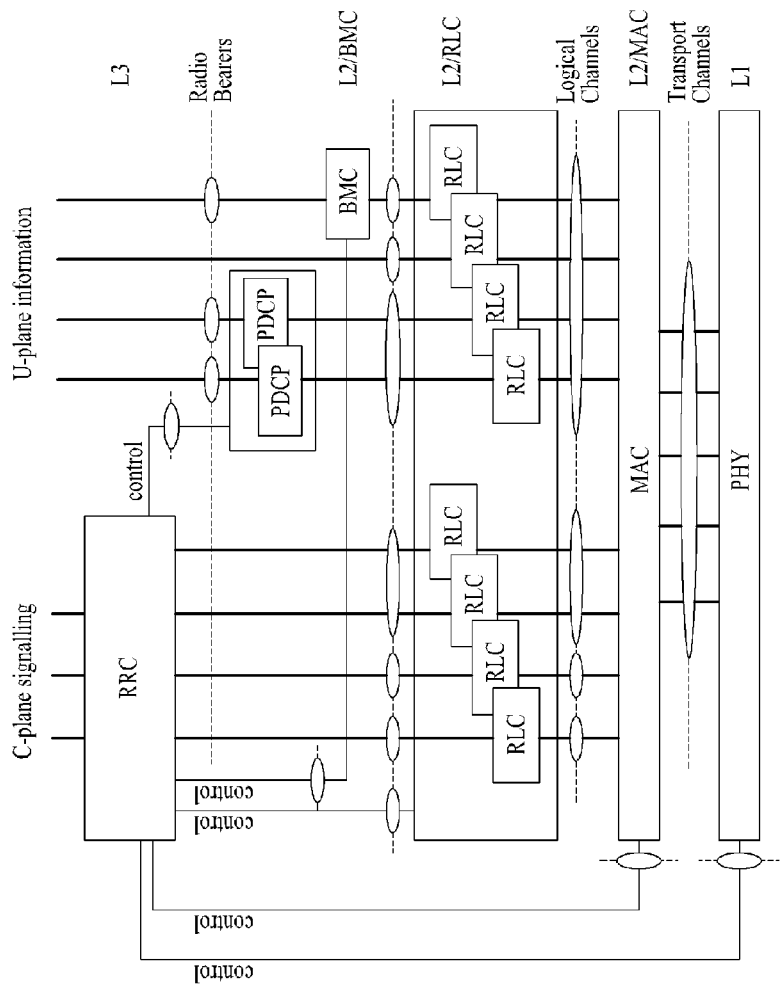

[Fig. 3]
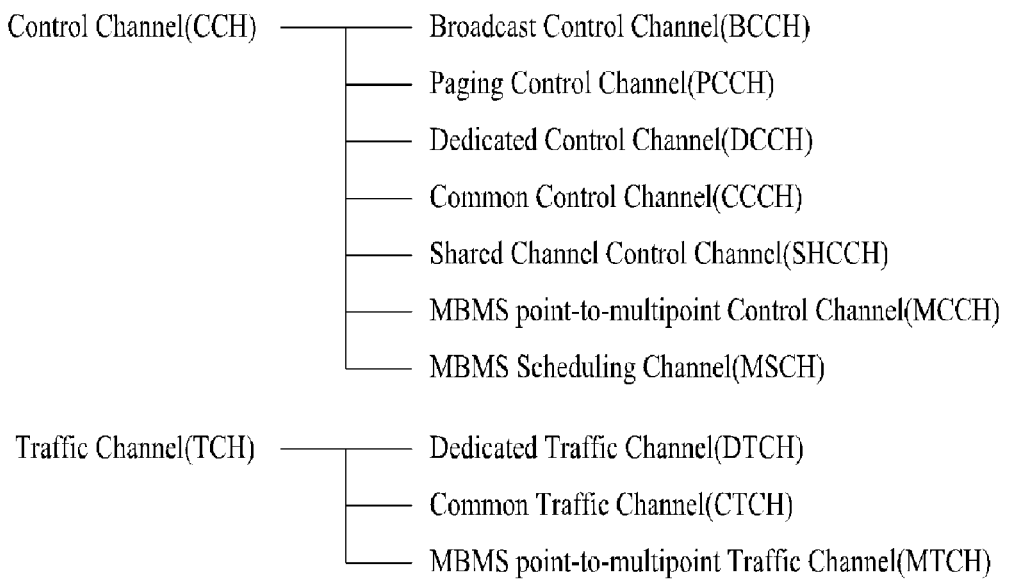

[Fig. 4]
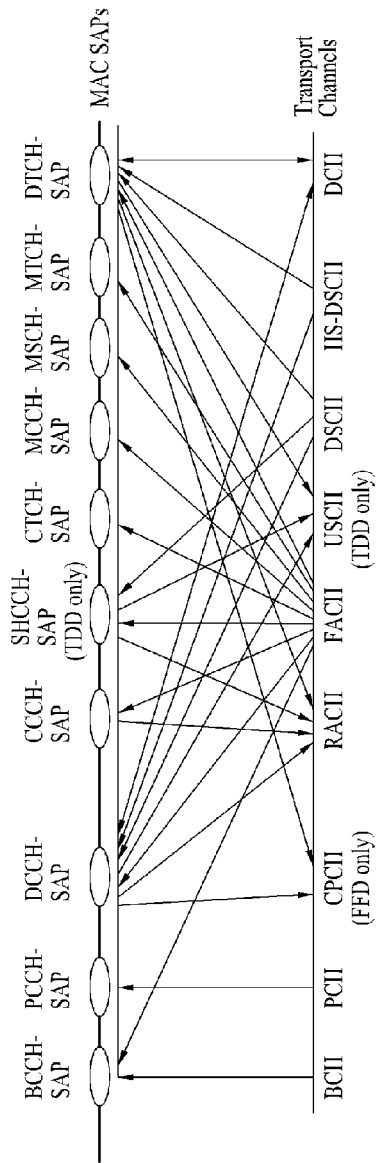
[Fig. 5]
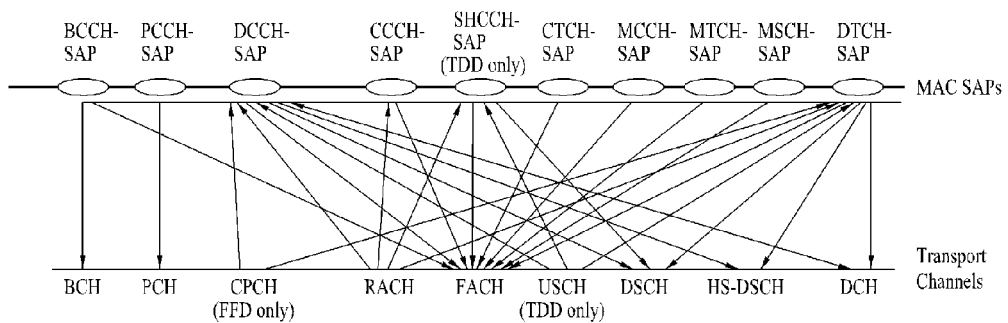

[Fig. 6]
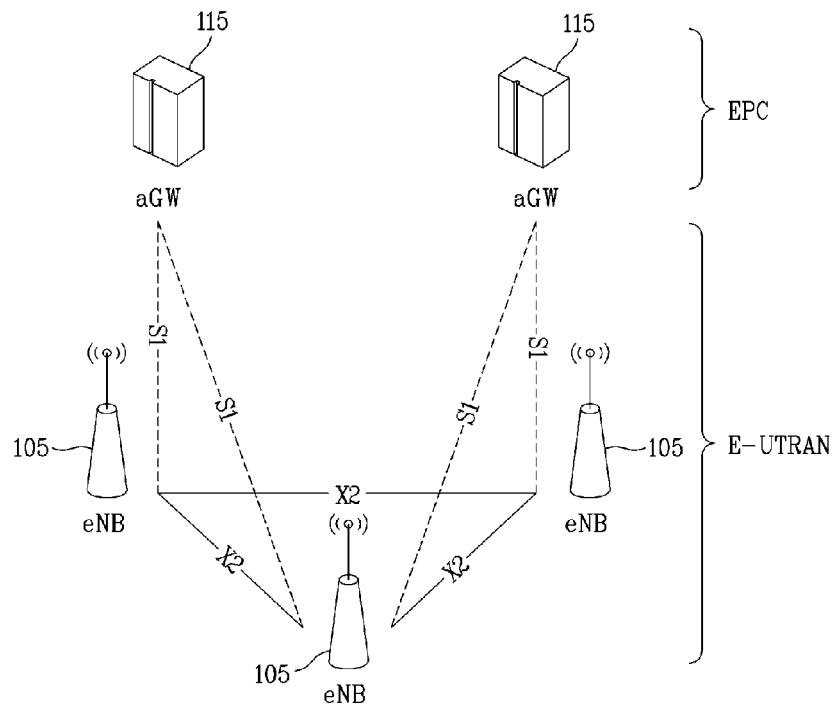
[Fig. 7]
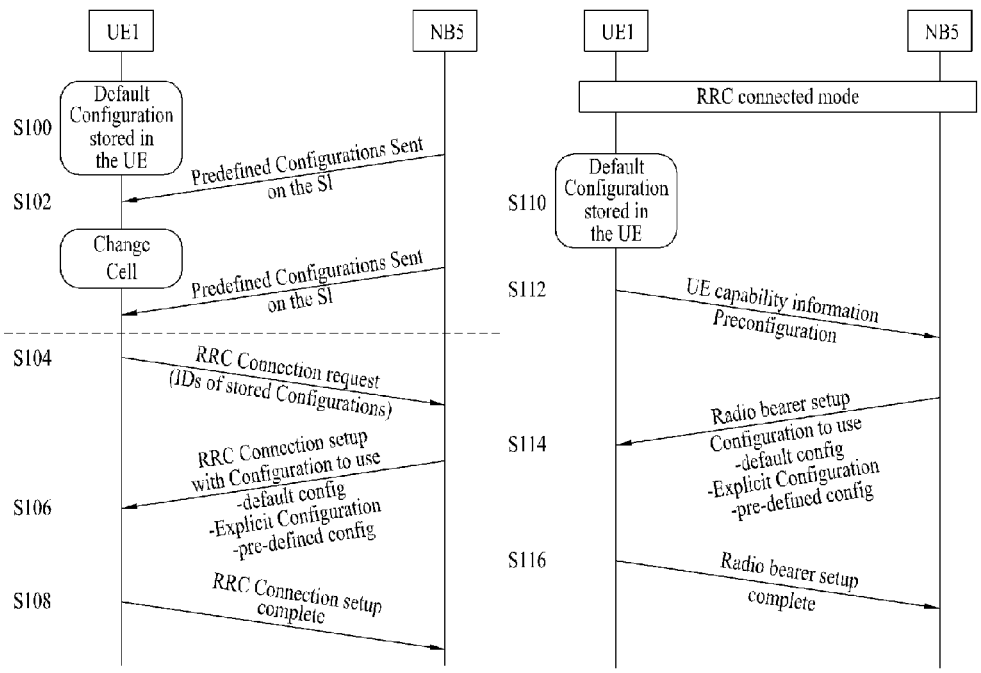

[Fig. 8]
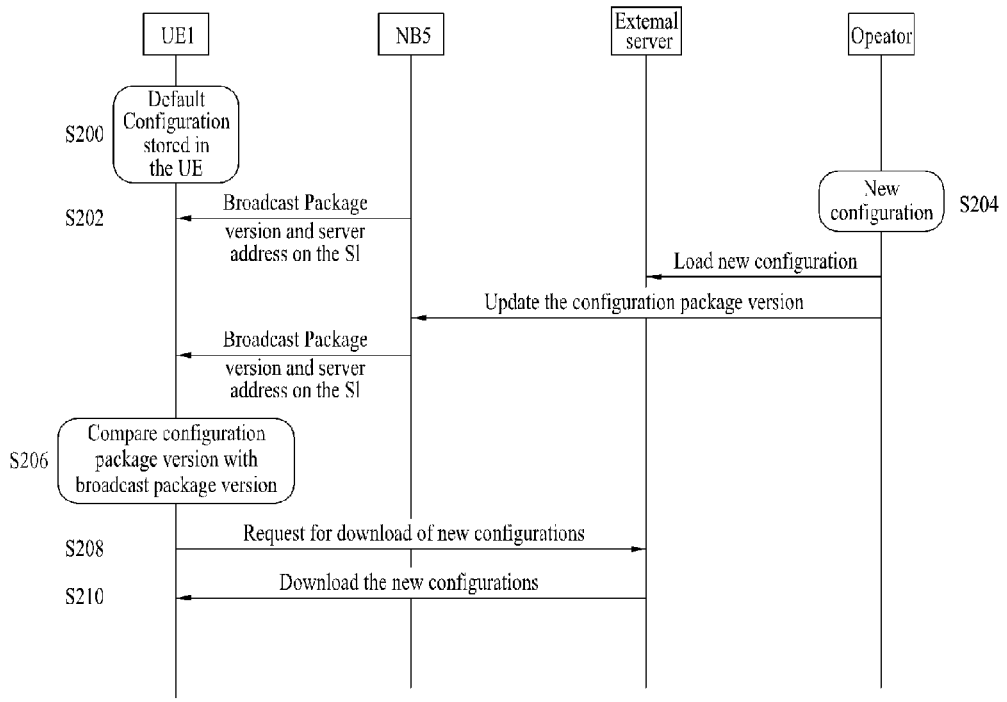
[Fig. 9]
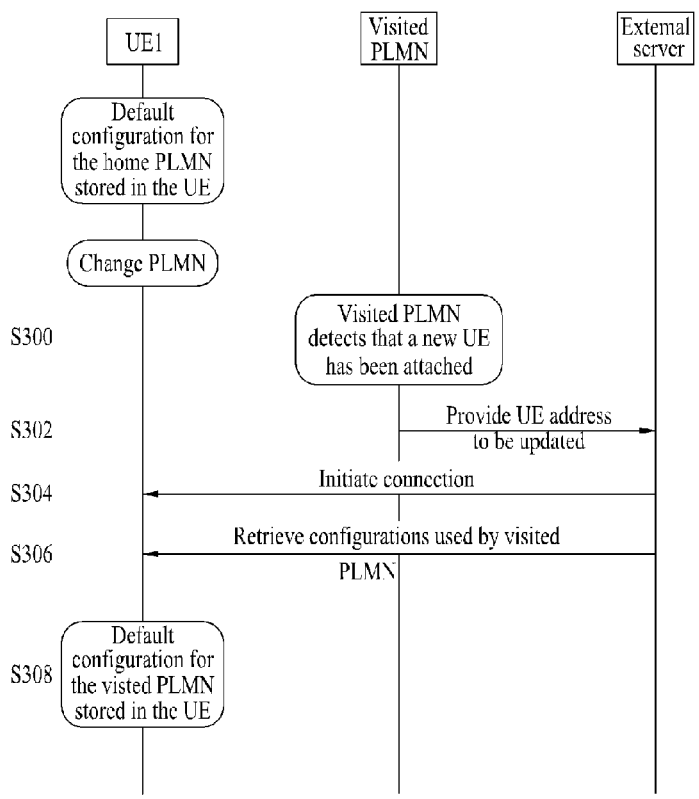

[Fig. 10]
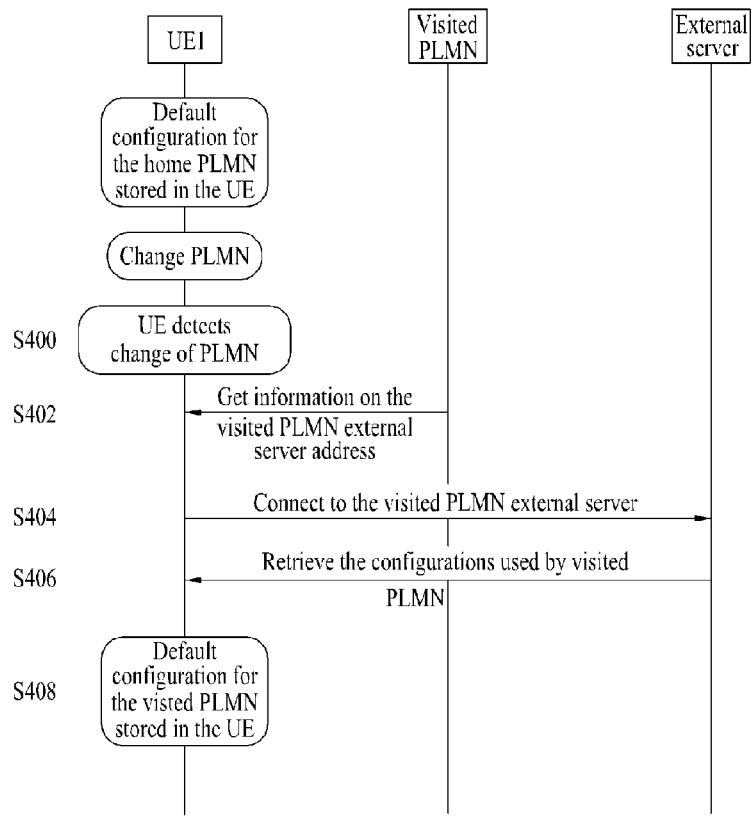
[Fig. 11]
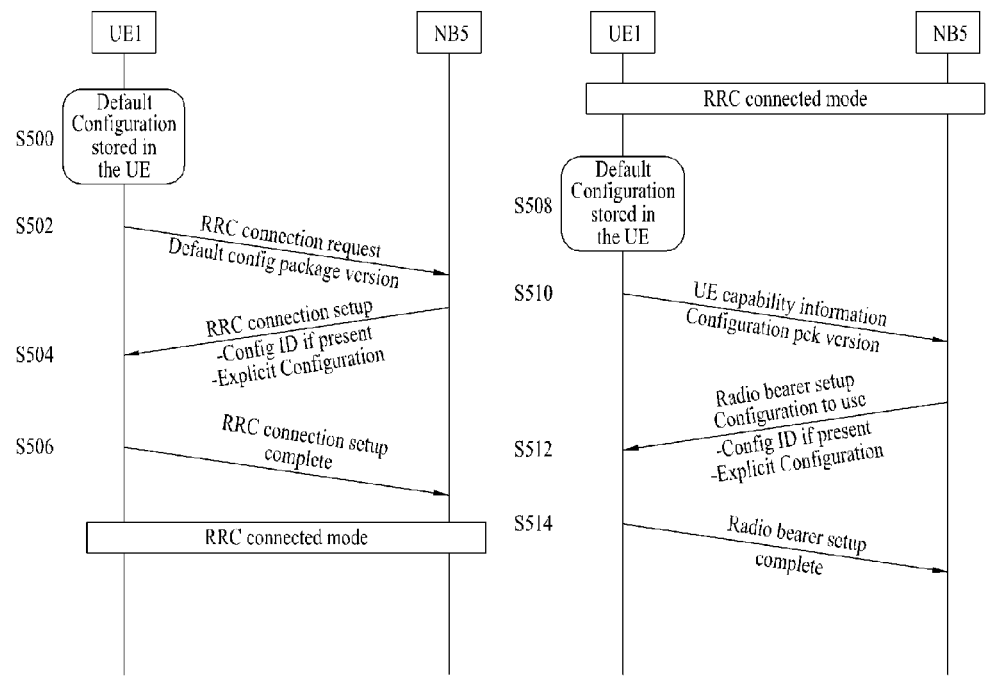

[Fig. 12]
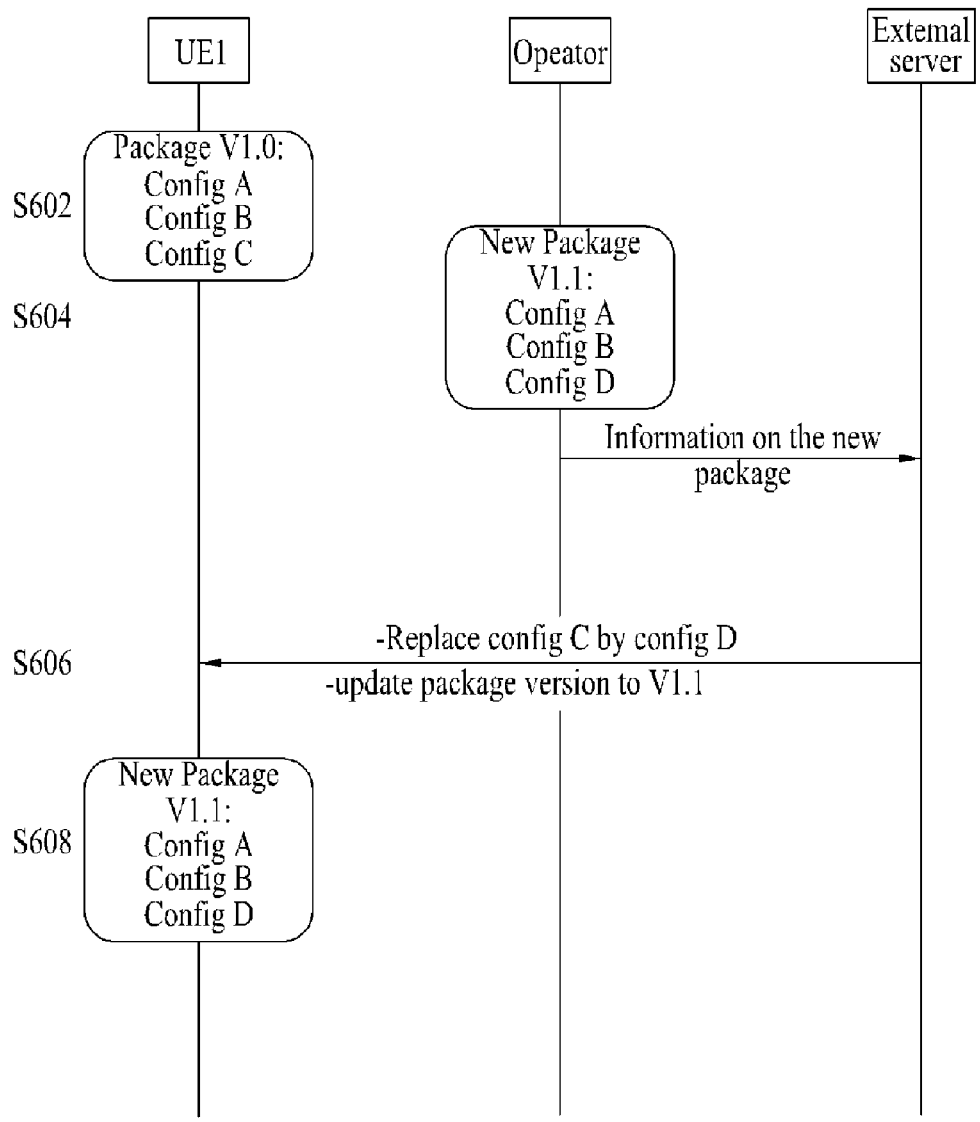

[Fig. 13]
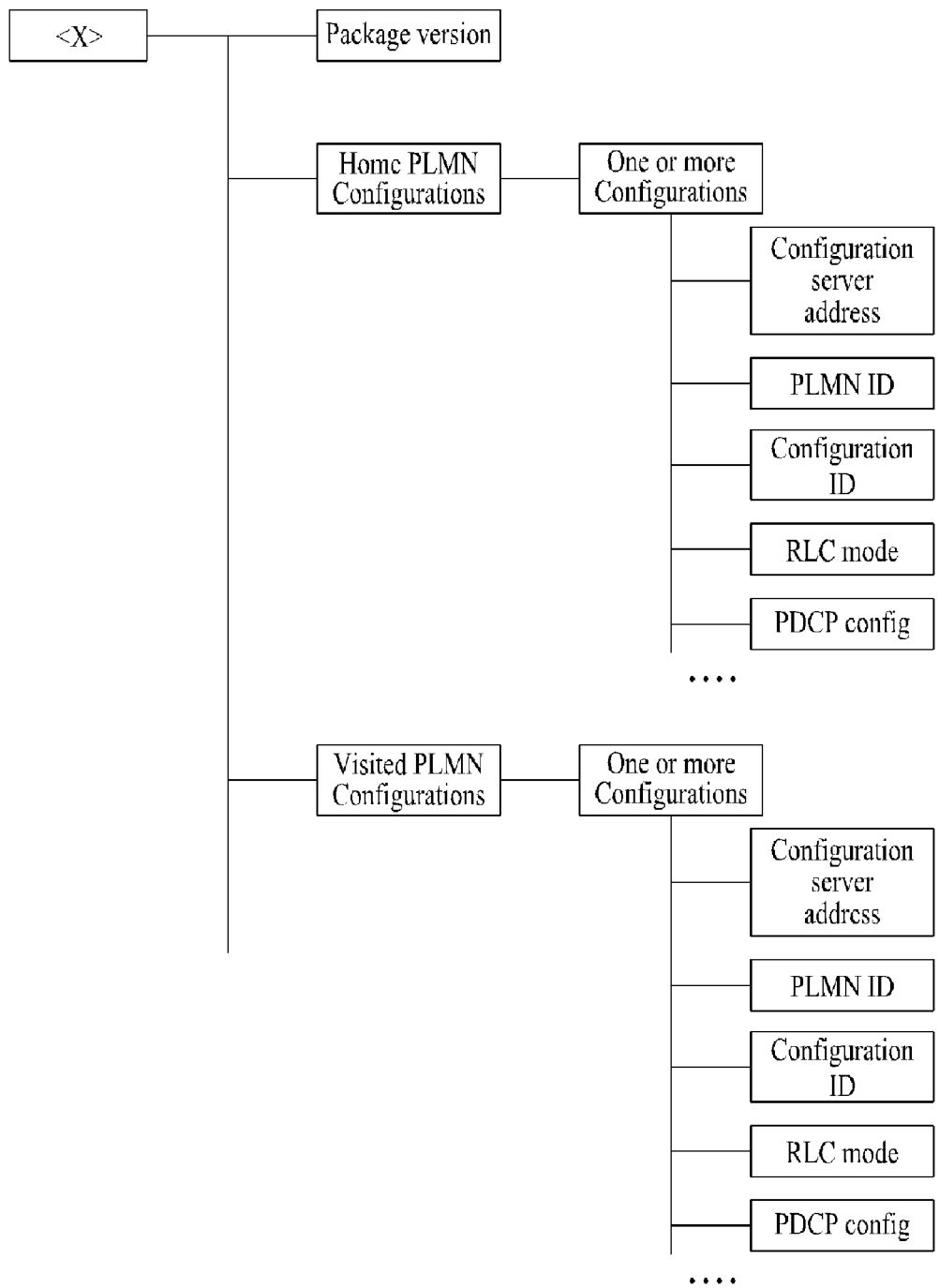

[Fig. 14]
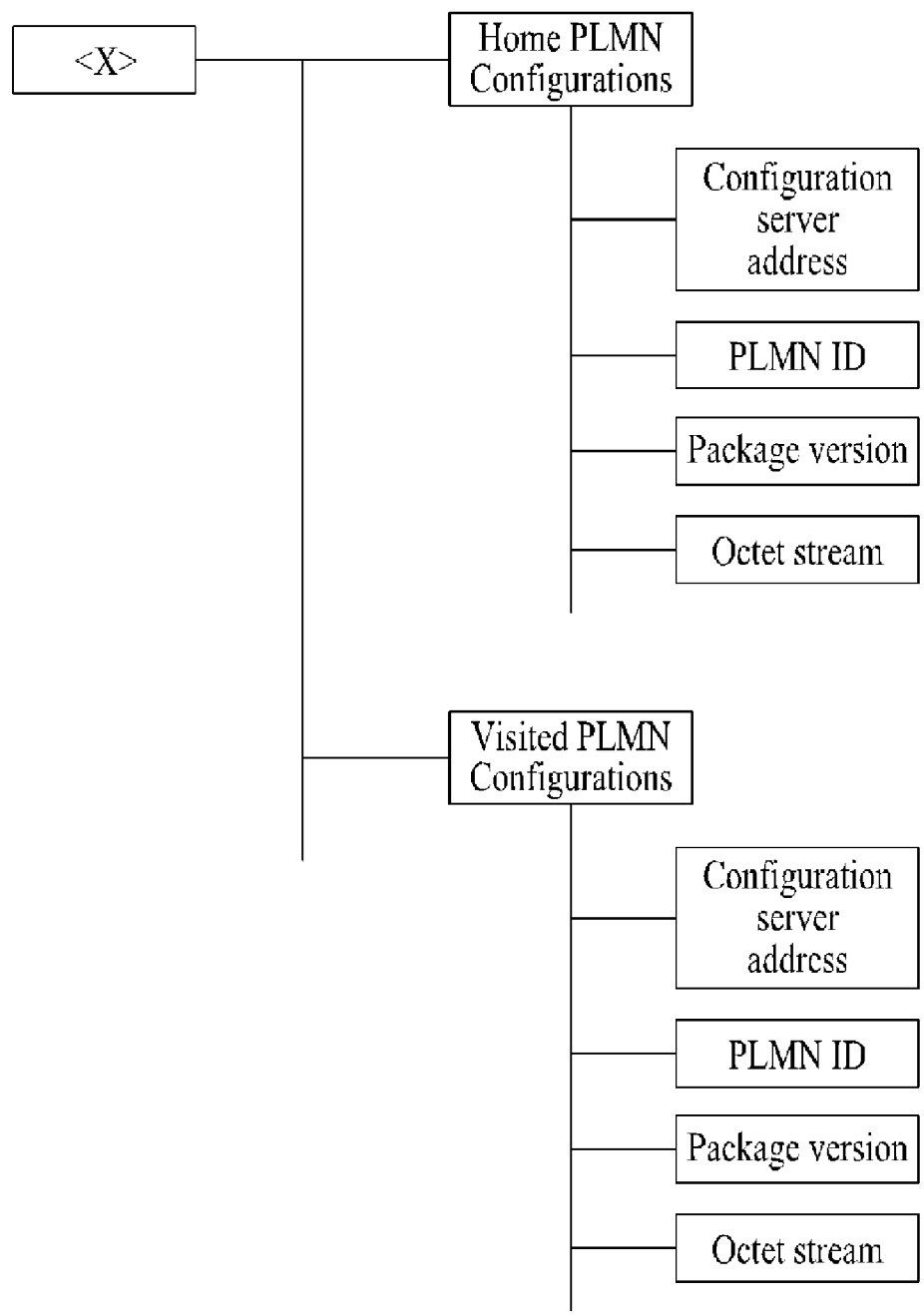

[Fig. 15]
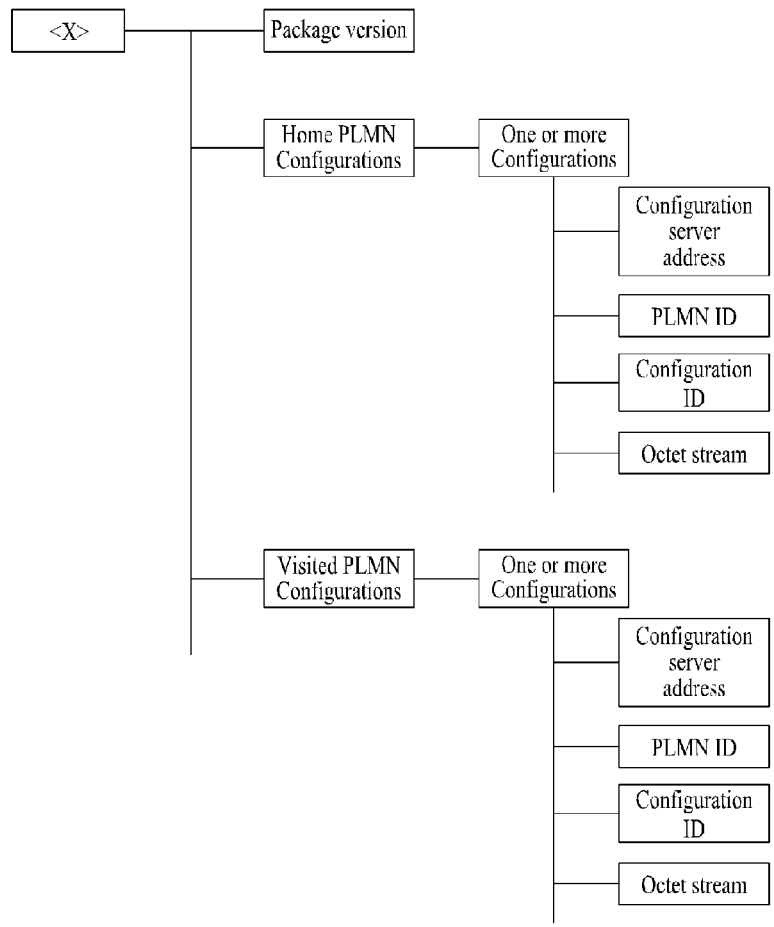
[Fig. 16]
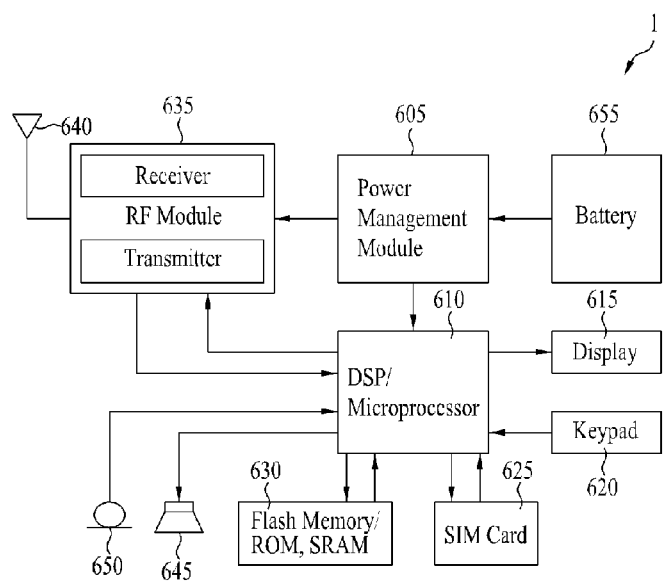

METHOD AND PROCEDURES FOR RADIO BEARER SETUP

CROSS-REFERENCE TO RELATED APPLICATIONS

This application is the National Stage filing under 35 U.S.C. §371 of International Application No. PCT/KR2008/002450, filed on Apr. 30, 2008, which claims the benefit of U.S. Provisional Application Ser. No. 60/915,036, filed on Apr. 30, 2007.

TECHNICAL FIELD

The present invention is directed to optimizing the radio bearer setup procedure and, specifically, a method for downloading new default configurations in order to allow mobile terminals to use the default configurations as often as possible for radio bearer setup.

BACKGROUND ART

A universal mobile telecommunication system (UMTS) is a European-type, third generation IMT-2000 mobile communication system that has evolved from a European standard known as Global System for Mobile communications (GSM).

UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs (NB) 5 that are connected via the Iub interface. Each RNC 4 controls several NBs (NB) 5. Each NB controls one or several cells, where a cell covers a given geo-graphical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the Iur interface. The RNC 4 handles the assignment and management of radio resources and operates as an access point with respect to the CN 3.

The NBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the GS interface, to the gateway GPRS support node (GGSN) 9 via the GN interface, and to the home subscriber server (HSS) via the GR interface.

The EIR 8 hosts lists of UEs 1 that are allowed access to the network. The EIR 8 also hosts lists of UEs 1 that are not allowed access to the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the GC interface and to the Internet via the GI interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

FIG. 3 illustrates the different logical channels that exist. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH), as well as other channels. The BCCH provides information including information utilized by a UE 1 to access a system. The PCCH is used by the UTRAN 2 to access a UE 1.

Additional traffic and control channels are introduced in the Multimedia Broadcast Multicast Service (MBMS) standard for the purposes of MBMS. The MBMS point-to-multipoint control channel (MCCH) is used for transmission of MBMS control information. The MBMS point-to-multipoint traffic channel (MTCH) is used for transmitting MBMS service data. The MBMS scheduling channel (MSCH) is used to transmit scheduling information.

The MAC layer is connected to the physical layer by transport channels. The MAC layer can be divided into a MAC-b sub-layer, a MAC-d sub-layer, a MAC-c/sh sub-layer, a MAC-hs sub-layer and a MAC-m sublayer according to the type of transport channel being managed.

The MAC-b sub-layer manages a broadcast channel (BCH), which is a transport channel handling the broadcasting of system information. The MAC-c/sh sub-layer manages a common transport channel, such as a forward access channel (FACH) or a downlink shared channel (DSCH), which is shared by a plurality of UEs 1, or in the uplink the radio access channel (RACH). The MAC-m sublayer may handle MBMS data.

FIG. 4 illustrates the possible mapping between the logical channels and the transport channels from a UE 1 perspective. FIG. 5 illustrates the possible mapping between the logical channels and the transport channels from a UTRAN 2 perspective.

The MAC-d sub-layer manages a dedicated channel (DCH), which is a dedicated transport channel for a specific UE 1. The MAC-d sublayer is located in a serving RNC 4 (SRNC) that manages a corresponding UE 1. One MAC-d sublayer also exists in each UE 1.

The RLC layer supports reliable data transmissions and performs segmentation and concatenation on a plurality of RLC service data units (SDUs) delivered from an upper layer depending of the RLC mode of operation. The RLC layer adjusts the size of each RLC SDU received from the upper layer in an appropriate manner based upon processing capacity and then creates data units by adding header information RLC SDU. The data units, or protocol data units (PDUs), are transferred to the MAC layer via a logical channel. The RLC layer includes a RLC buffer for storing the RLC SDUs and/or the RLC PDUs.

An RLC entity may operate in one of three different modes. Specifically, an RLC entity may operate in a transparent mode (Tr RLC), an unacknowledged mode (UM RLC) or an acknowledged mode (AM RLC).

The differences between the three modes are whether or not a header will be added to one SDU and the three modes allow different functions with common segmentation and concatenation functions for. The RLC mode is according to the required radio bearer and the type of service, such as voice, video conferencing, VoIP, or Internet browsing.

The BMC layer schedules a cell broadcast (CB) message transferred from the CN 3. The BMC layer broadcasts the CB message to UEs 1 positioned in a specific cell or cells.

The PDCP layer is located above the RLC layer. The PDCP layer is used to transmit network protocol data, such as the IPv4 or IPv6, efficiently on a radio interface with a relatively small bandwidth. The PDCP layer reduces unnecessary control information used in a wired network, a function called header compression, for this purpose.

The PDCP layer may operate in one of three different modes depending upon whether or not IP header compression is performed. A PDCP header is added when IP header compression is performed. The header includes information such as header compression protocol type, packet type, and PDU type to indicate a data PDU or sequence number PDU.

A UE 1 must know which configuration, such as RLC mode or PDCP mode, to use in order for a given a Public Land Mobile Network (PLMN) to establish a connection with a specific radio bearer. This will be further disclosed with in relation to the radio bearer establishment procedure in UMTS.

The radio resource control (RRC) layer located at the lowest portion of the third layer (L3) is only defined in the C-plane. The RRC layer controls the transport channels and the physical channels in relation to setup, reconfiguration, and the release or cancellation of the radio bearers (RBs).

A RB signifies a service provided by the second layer (L2) for data transmission between a UE 1 and the UTRAN 2. The set up of the RB generally refers to the process of stipulating the characteristics of a protocol layer and a channel required for providing a specific data service and setting the respective detailed parameters and operation methods. The RRC also handles user mobility within the RAN and additional services, such as location services.

Not all different possibilities for the mapping between the RBs and the transport channels for a given UE 1 are available all the time. The UE 1/UTRAN 2 deduce the possible mapping depending on the UE state and the procedure presently executed by the UE/UTRAN.

The different transport channels are mapped onto different physical channels. The configuration of the physical channels is given by RRC signaling exchanged between the RNC 4 and the UE 1.

Initial access is a procedure whereby a UE 1 sends a first message to the UTRAN 2 using a common uplink channel, specifically the Random Access Channel (RACH). For both GSM and UMTS systems, the initial access procedure involves the UE 1 transmitting a connection request message that includes a reason for the request and receiving a response from the UTRAN 2 indicating the allocation of radio resources for the requested reason.

There are several reasons, or establishment causes, for sending a connection request message. Table I indicates the establishment causes specified in UMTS, specifically in 3GPP TS 25.331.

The originating call establishment cause indicates that the UE 1 wants to setup a connection, for example, a speech connection. The terminating call establishment cause indicates that UE 1 answers to paging. The registration establishment cause indicates that the user wants to register only to location update.

A physical random access procedure is used to send information over the air. The physical random access transmission is under control of a higher layer protocol, which performs important functions related to priority and load control. This procedure differs between GSM and UMTS radio systems.

The description of GSM random access procedure can be found in The GSM System for Mobile Communications published by M. Mouly and M. B. Pautet, 1992. As the present invention is related to UMTS enhancement and evolution, the W-CDMA random access procedure is detailed herein. Although the present invention is explained in the context of UMTS evolution, the present invention is not so limited.

TABLE 1

Establishment Causes

Originating Conversational Call
Originating Streaming Call
Originating Interactive Call
Originating Background Call
Originating Subscribed traffic Call
Terminating Conversational Call
Terminating Streaming Call
Terminating Interactive Call
Terminating Background Call
Emergency Call
Inter-RAT cell re-selection
Inter-RAT cell change order
Registration
Detach
Originating High Priority Signaling
Originating Low Priority Signaling
Call re-establishment
Terminating High Priority Signaling
Terminating Low Priority Signaling The transport channel RACH and two physical channels, Physical Random Access Channel (PRACH) and Acquisition Indication Channel (AICH), are utilized in this procedure. The transport channels are channels supplied by the physical layer to the protocol layer of the MAC layer. There are several types of transport channels to transmit data with different properties and transmission formats over the physical layer.

Physical channels are identified by code and frequency in Frequency Division Duplex (FDD) mode and are generally based on a layer configuration of radio frames and timeslots. The form of radio frames and timeslots depends on the symbol rate of the physical channel.

A radio frame is the minimum unit in the decoding process, consisting of 15 time slots. A time slot is the minimum unit in the Layer 1 bit sequence. Therefore, the number of bits that can be accommodated in one time slot depends on the physical channel.

The transport channel RACH is an uplink common channel used for transmitting control information and user data. The transport channel RACH is utilized in random access and used for low-rate data transmissions from a higher layer. The RACH is mapped to an uplink physical channel, specifically the PRACH. The AICH is a downlink common channel, which exists as a pair with PRACH used for random access control.

The E-UTRA (Evolved UMTS Terrestrial Radio Access) system, or LTE (Long Term Evolution) system, is considered to involve the PS (Packet Switched) domain with only shared resources used. The use of LTE RACH (LTE Random Access Channel) should be somewhat different from existing GSM and UMTS systems in order to meet access requirements specified for LTE with faster delay and higher capacity requirements. The E-UTRA and LTE are related to the principles of Orthogonal Frequency Division Multiplexing (OFDM).

FIG. 6 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3G LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UT-RAN). The NB 5 and/or RNC 4 correspond to e-NodeB (eNb) in the LTE system.

OFDM is based on the well-known technique of Frequency Division Multiplexing (FDM). Different streams of information are mapped onto separate parallel frequency channels in FDM. Each FDM channel is separated from the other FDM channels by a frequency guard band in order to reduce interference between adjacent channels.

The OFDM technique differs from traditional FDM in the ways that multiple carriers, or sub-carriers, carry the information stream. The sub-carriers are orthogonal to each other in that the bandwidths of the individual sub-carriers are small and arranged such that the maximum of one carrier corresponds with the first minimum of the adjacent carrier. A guard time may be added to each symbol in order to address the channel delay spread.

An exemplary Frequency-Time representation of an OFDM signal may include multiple sub-carriers, with each sub-carrier having a particular bandwidth or frequency range. The signal may carry data or information represented by symbols with guard intervals between the symbols.

The multi-user system includes both uplinks and downlinks. The NB 5 measures the attenuation at the different uplink sub-carriers and distributes the sub-carriers according to the measurements for use by the different UEs 1 for uplink transmission. A UE 1 measures the attenuation for each downlink sub-carrier with the result of the measurement signaled to the NB 5, which distributes downlink sub-carriers for better UE reception.

A UE 1 transmits a known signal sequence, such as a specific coded signature, to the NB in a random access protocol. The UE 1 first listens for a pilot channel transmitted by the NB 5 and synchronizes to OFDM symbols transmitted by the NB 5 upon detection. The UE then listens to a broadcast system information channel for a random access sequence and a sub-carrier number assigned to a random access channel (RACH) and transmits a random access sequence in the random access channel. The UE 1 checks whether the NB 5 has granted access after transmission for a number of cycles of the random access sequence.

A UE 1 has to load a certain configuration when establishing a UMTS radio bearer service during radio bearer setup in each PLMN. The configuration includes RLC mode, PDCP mode, MAC configuration and other parameters that are used for the radio bearer.

The RNC will send the UE 1 the correct configuration for use upon establishment of a radio bearer. Different schemes are possible, from more efficient to less efficient.

The first scheme is a default configuration. The UE 1 has a set of configurations defined in the standard and stored in memory. Each configuration can be identified by a configuration identification (ID) and the NB 5 uses this ID to indicate to the UE 1 which configuration it should use. This configuration is called the default configuration.

The second scheme is a pre-defined configuration. A set of configurations currently used in the PLMN is broadcast on the System Information (SI). These configurations, which may be different from the default configurations, are called the pre-defined configurations and also are identified with a configuration ID. Therefore, the UE 1 should store these pre-defined configurations when listening to the SI and delete the pre-defined after expiration of a timer, such as a 6-hour System Information Broadcasts (SIB) timer.

The third scheme is an explicit configuration. The RNC may send the explicit configurations to the UE 1.

The determination of which of the three schemes to use depends on the configuration that should be used and on the availability of default configurations, the predefined configurations and the explicit configurations. All the pre-defined configurations either have an independent identifier or the configurations may be classified by set, with each set having a set ID and each configuration identified with a set ID and an index indicating a configuration within the identified set.

FIG. 7 illustrates an example message flow for radio bearer setup. The following description related to FIG. 7 assumes that each default configuration and pre-defined configuration has a unique configuration ID.

As illustrated in FIG. 7, a set of default configurations defined in the standard is stored in the UE 1 (S100). Each configuration has a unique configuration identifier.

A set of pre-defined configurations is broadcast in each cell of the PLMN. The UE 1 will listen to the SI upon moving to a different cell if the value tag on the SI has changed (S102). The UE 1 will store the pre-defined configurations for a specified time, such as six hours for the SIB timer expiration time.

The procedure performed by the UE 1 differs depending upon whether the UE is in an IDLE state or RRC connected state. The UE will perform step S104 through step S108 to transition to an RRC connected state in addition to step S110 through step S116 if in the IDLE state. The UE 1 will perform only step S110 through step S116 if already in RRC connected state.

A UE 1 in the IDLE state is requested by a higher layer to transition to RRC connected state. The UE 1 transmits an RRC connection request to the NB 5 along with the IDs of the pre-defined configuration the UE has stored in memory (S104). However, the NB 5 cannot know if the UE 1 successfully stored all the broadcasted pre-defined configurations.

The UE receives an RRC connection setup message from the NB 5 (S106). The RRC connection setup message indicates a configuration for the radio bearer used to setup an RRC connection and signaling. The configuration may be indicated by either sending the configuration ID of a default configuration or pre-defined configuration stored in the UE 1 or explicitly sending the configuration if the UE has not stored the required configuration.

The UE 1 then has established an RRC connection. The UE 1 then transmits an RRC connection setup complete message to the NB 5 (S108).

Default configurations as well as some pre-defined configurations are stored in the UE 1 once the UE is RRC connected (S110).

The UE 1 must send a UE capability information message to the NB 5 in order to inform the NB of the last pre-defined configuration stored in the UE if there is a change in the list of stored pre-defined configuration while an RRC connection is established (S112).

A radio bearer is then setup by the NB 5 informing the UE 1 of the configuration to use (S114). The NB 5 may inform the UE 1 of the configuration by either sending the configuration ID if the UE has stored the required default configuration or pre-defined configuration or explicitly sending the configuration if the UE has not stored the required configuration. The UE 1 then transmits a radio bearer setup complete message to the NB 5 (S116).

A UE 1 has to use a certain configuration compatible with the radio bearer that will be established during the radio bearer setup procedure in E-UTRAN. This configuration includes information such as RLC mode and PDCP mode.

There are different ways for a NB 5 in UMTS to indicate which configuration the UE 1 should use. The NB 5 can send the identifier of a default configuration stored in the UE 1, send the identifier of a configuration broadcast in a PLMN and temporarily stored in the UE, or send the exact configuration that the UE should use.

DISCLOSURE OF INVENTION

Technical Problem

The most efficient method is to use default configurations that are listed in the standard, which allow radio bearer setup to be performed very quickly. However, the default configurations stored in the UE 1 normally cannot be modified and are not sufficient to provide the entire needed configuration to meet requirements that are not static. Furthermore, the delay for transmission of configurations still must be optimized in view of the low bandwidth configurations of 1.25 MHz and 2.5 MHz.

Technical Solution

To cope with the technical problems, in one aspect of the present invention, a method of setting a radio bearer in a wireless communication system is provided. The method includes storing a default set of radio bearer configuration parameters with an associated configuration identifier and a default package identifier, receiving a radio resource control (RRC) configuration package identifier through a broadcast channel, requesting an updated set of radio bearer configuration parameters with an associated configuration identifier and an updated package identifier, receiving at least one of the updated set of radio bearer configuration parameters with the associated configuration identifier and the updated package identifier, determining if the received RRC configuration package identifier is different from the default package identifier, storing the received at least one of the updated set of radio bearer configuration parameters with the associated configuration identifier and the updated package identifier as the default radio bearer configuration parameters with the associated configuration identifier and the default package identifier if it is determined that the received RRC configuration package identifier is different from the default package identifier, transmitting an RRC connection request to a base station using the default package identifier, receiving an RRC connection setup message including a configuration identifier or configuration parameters, transmitting an RRC connection setup complete message to the base station through a wireless connection established using parameters associated with the configuration identifier or the configuration parameters received in the RRC connection setup message.

It is contemplated that the radio bearer configuration parameters include at least one of radio link control (RLC) mode, packet data convergence protocol (PDCP) mode or medium access control (MAC) configuration.

It is further contemplated that the method further includes transmitting a capability information message including the default package identifier to the base station while an RRC connection is established and receiving a radio bearer setup message including a configuration identifier or a configuration parameter.

It is contemplated that the request for the updated set of radio bearer configuration parameters with the associated configuration identifier and the updated package identifier is made to an external server. It is further contemplated that the package identifier includes a package version.

In another aspect of the present invention, a method of setting a radio bearer in a wireless communication system is provided. The method includes storing a first set of radio bearer configuration parameters with an associated configuration identifier and a default package identifier, detecting a non-home network, receiving an updated set of radio bearer configuration parameters with an associated configuration identifier and an updated package identifier, storing the updated set of radio bearer configuration parameters with the associated configuration identifier and the updated package identifier as a second set if the updated package identifier is different from the default package identifier in the first set, transmitting an RRC connection request to a base station using the default package identifier, receiving an RRC connection setup message including a configuration identifier or configuration parameters, transmitting an RRC connection setup complete message to the base station through a wireless connection established using parameters associated with the configuration identifier or the configuration parameters received in the RRC connection setup message.

Preferably, receiving the updated set of radio bearer configuration parameters with the associated configuration identifier and the updated package identifier includes using an external server address received through a broadcast channel of the non-home network.

In another aspect of the present invention, a mobile terminal for setting a radio bearer in a wireless communication system is provided. The mobile terminal includes a transmitting/receiving unit transmitting and receiving signals to and from a base station, a display unit displaying user interface information, an input unit receiving inputs from a user, a storage unit for storing information and a processing unit for controlling the storage unit to store a default set of radio bearer configuration parameters with an associated configuration identifier and a default package identifier, processing a radio resource control (RRC) configuration package identifier received through a broadcast channel, controlling the transmitting/receiving unit to request an updated set of radio bearer configuration parameters with an associated configuration identifier and an updated package identifier, processing at least one of a received updated set of radio bearer configuration parameters with an associated configuration identifier or a received updated package identifier, determining if the received RRC configuration package identifier is different from the default package identifier, controlling the storage unit to store the received at least one of the updated set of radio bearer configuration parameters with the associated configuration identifier or the updated package identifier as the default radio bearer configuration parameters with the associated configuration identifier and the default package identifier if it is determined that the received RRC configuration package identifier is different from the default package identifier, controlling the transmitting/receiving unit to transmit an RRC connection request to a base station using the default package identifier, processing a received RRC connection setup message including a configuration identifier or configuration parameters and controlling the transmitting/receiving unit to transmit an RRC connection setup complete message to the base station through a wireless connection established using parameters associated with the one of the configuration identifier and the configuration parameters received in the RRC connection setup message.

It is contemplated that the radio bearer configuration parameters include at least one of radio link control (RLC) mode, packet data convergence protocol (PDCP) mode, or medium access control (MAC) configuration.

It is further contemplated that the processing unit further controls the transmitting/receiving unit to transmit a capability information message including the default package identifier to the base station while an RRC connection is established and processes a received radio bearer setup message including a configuration identifier or a configuration parameter.

It is contemplated that the request for the updated set of radio bearer configuration parameters with the associated configuration identifier and the updated package identifier is made to an external server.

It is further contemplated that the package identifier includes a package version.

In another aspect of the present invention, a mobile terminal for setting a radio bearer in a wireless communication system is provided. The mobile terminal includes a transmitting/receiving unit transmitting and receiving signals to and from a base station, a display unit displaying user interface information, an input unit receiving inputs from a user, a storage unit for storing information and a processing unit for controlling the storage unit to store a first set of radio bearer configuration parameters with an associated configuration identifier and a default package identifier, detecting a non-home network, processing a received updated set of radio bearer configuration parameters with an associated configuration identifier and an updated package identifier, controlling the storage unit to store the updated set of radio bearer configuration parameters with the associated configuration identifier and the updated package identifier as a second set if the updated package identifier is different from the default package identifier in the first set, controlling the transmitting/receiving unit to transmit an RRC connection request to a base station using the default package identifier, processing a received RRC connection setup message including a configuration identifier or configuration parameters, controlling the transmitting/receiving unit to transmit an RRC connection setup complete message to the base station through a wireless connection established using parameters associated with the configuration identifier or the configuration parameters received in the RRC connection setup message. Preferably, processing the received updated set of radio bearer configuration parameters with the associated configuration identifier and the updated package identifier includes using an external server address received through a broadcast channel of the non-home network.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

Advantageous Effects

According to the method and apparatus for optimizing the radio bearer setup procedure of the present invention, downloading new default configurations allows a mobile terminal to use the default configuration as often as possible for radio bearer setup, thereby precluding the need to broadcast any pre-defined configurations, parameters and identifiers.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

FIG. 1 illustrates an overview of a UMTS network.

FIG. 2 illustrates a structure of a radio interface protocol between a UE and the UTRAN according to the 3GPP radio access network standards.

FIG. 3 illustrates the different logical channels.

FIG. 4 illustrates logical channels mapped onto transport channels as seen from the UE side.

FIG. 5 illustrates logical channels mapped onto transport channels as seen from the UTRAN side.

FIG. 6 illustrates the architecture of an LTE system.

FIG. 7 illustrates a procedure for radio bearer setup.

FIG. 8 illustrates a procedure for updating the stored configuration according to the present invention.

FIG. 9 illustrates a first alternative for updating a PLMN configuration for a roaming mobile terminal according to the present invention.

FIG. 10 illustrates a second alternative for updating a PLMN configuration for a roaming mobile terminal according to the present invention.

FIG. 11 illustrates a new procedure for radio bearer setup according to the present invention.

FIG. 12 illustrates handling package versions according to the present invention.

FIG. 13 illustrates using a management object to handle configurations according to the present invention.

FIG. 14 illustrates using a management object to handle configurations in a fully transparent mode according to the present invention.

FIG. 15 illustrates using a management object to handle configurations in a half-transparent mode according to the present invention.

FIG. 16 illustrates a block diagram of a mobile station (MS) or access terminal (AT) according to the present invention.

MODE FOR THE INVENTION

The present invention proposes to optimize the radio bearer setup procedure by downloading new default configurations via the Open Mobile Alliance (OMA) Device Management (DM) protocol in order to allow a UE 1 to use the default configuration as often as possible for radio bearer setup.

This precludes the need to broadcast any pre-defined configurations, parameters and identifiers on the SI.

The invention proposes that the UE 1 retrieves and updates its default configurations from a server belonging to the PLMN on which the UE camps. For example, the UE 1 may use the DM protocol specified by OMA Device management.

The server would be updated accordingly each time the operator adds or deletes a configuration or the version of the configuration package stored on the server is updated. A UE 1 would check if it has the latest version of the PLMN configuration package on a regular basis and whenever the UE joins a PLMN for the first time.

There would be two steps in the radio bearer setup procedure. The stored configuration would be updated according to the procedure in FIG. 8 and the new procedure for radio bearer setup would be according to FIG. 11.

As illustrated In FIG. 8, a package of default configuration as well as the version number of the package is stored in the UE 1 (S200). The NB 5 broadcasts the latest configuration package version available on the SI (S202). The NB 5 may also broadcast the address of the server from which the UE 1 may download the new configurations.

Updates are required when the operator sets a new configuration (S204). The new configuration must be loaded on the external server, such as the operator DM server. Furthermore, the configuration package version must be updated since the version number increases each time a new configuration or set of configurations is loaded on the server. Moreover, the configuration package version number broadcast on the SI increases.

The UE 1 compares its package version with the version broadcast on the SI (S206). One alternative is for the UE 1 to check on a regular basis if it has the latest version.

The UE connects to the server after reading the server address on the SI in order to update to the latest version if the package version stored in the UE 1 is not the latest version (S208). The UE 1 may use, for example, the OMA DM protocol. The UE 1 then downloads the new configurations from the server (S210).

The configurations stored in the UE 1 will be different for different PLMNs. Therefore, the UE 1 should retrieve the configurations of the most recent configuration package of a new PLMN to which the UE subscribes or when a first connection is made on the new PLMN such that the NB 5 does not have to send explicit configurations to the UE and can use the default configuration present in the package.

There are several ways the UE 1 can download the package when the UE is connected to the new PLMN. FIGS. 9 and 10 illustrate two alternatives. It is assumed in FIGS. 9 and 10 that the UE 1 has initially stored the default configuration of its home PLMN and then changes to a different PLMN.

FIG. 9 illustrates a first alternative for downloading the package when the UE 1 is roaming. The NB 5 detects that the UE 1 comes from another PLMN and the operator DM server can initiate a connection with the UE in order to update the configuration package.

As illustrated in FIG. 9, the visited PLMN detects that a new UE 1 has been attached to it (S300). The visited PLMN then contacts its external server, or DM server, to indicate the UE address that the server should use (S302).

A connection from the server to the client, or UE 1, is triggered when the visited PLMN contacts the server. The external server then initiates a connection with the UE 1 (S304).

The UE 1 retrieves the configurations from the external server in a configuration package version (S306). The default configurations for the visited PLMN are then stored in the UE 1 (S308).

FIG. 10 illustrates a second alternative for downloading the package when the UE 1 is roaming. The UE 1 detects that it is in a new PLMN and can initiate a connection with the operator DM server in order to retrieve the configurations. This alternative is the most straightforward since the NB 5 normally has no means to communicate with the DM server that handles the configurations used for the NB.

DM scheduling can also be used by setting a trap, which is a way to trigger an action after a specific event, such as contacting the DM server, downloading a specific program, or performing a virus removal operation. The trap may be the changing of the PLMN to which the UE 1 is attached and the triggered action the communication with the DM server.

As illustrated in FIG. 10, the UE 1 detects that it has attached to a new PLMN different from its home PLMN (S400). The UE 1 then retrieves information from the visited PLMN, such as its UE address, by accessing the external server or DM server belonging to the visited PLMN (S402). One way to for the UE 1 to retrieve the information would be to broadcast the server address on the BCH or indicate it to the UE at connection setup.

The UE 1 then initiates a connection with the external server (S404). The UE retrieves the configurations from the external server in a configuration package version (S406). The default configurations for the visited PLMN are then stored in the UE 1 (S408).

FIG. 11 illustrates the new procedure for radio bearer setup. The procedure illustrated in FIG. 11 is applicable whether or not the UE 1 is in a new PLMN.

The procedure performed by the UE 1 differs depending upon whether the UE is in an IDLE state or RRC connected state. The UE will perform step S500 through step S506 to transition to an RRC connected state in addition to step S508 through step S514 if in the IDLE state. The UE 1 will perform only step S508 through step S504 if already in RRC connected state.

As illustrated in FIG. 11, default configurations are stored in the UE 1 in a package with an associated package version number (S500). A UE 1 in the IDLE state is requested by a higher layer to transition to the RRC connected state and the UE transmits an RRC connection request to the NB 5 along with the configuration package version it has (S502).

The UE 1 then receives an RRC connection setup message from the NB 5 with the configuration the UE should use (S504). The NB 5 indicates the configuration either by sending the configuration ID if the UE 1 has a default configuration package version that contains the required configuration or explicitly sending the configuration if the UE 1 does not have a default configuration package version that contains the required configuration.

The UE then transmits an RRC connection setup complete message (S506). The UE 1 is then RRC connected.

Default configurations are stored in the UE 1 in a package with an associated package version number once the UE is RRC connected (S508). The UE 1 must send a UE capability information message to the NB 5 in order to indicate the last default configuration package version stored in the UE If there is a change in the default configuration package version while an RRC connection is established (S510).

A radio bearer is then setup by the NB 5 informing the UE 1 of the configuration to use (S512). The NB 5 may inform the UE 1 of the configuration by either sending the configuration ID if the UE 1 has a default configuration package version that contains the required configuration or explicitly sending the configuration if the UE does not have a default configuration package version that contains the required configuration. The radio bearer setup is completed and the UE 1 transmits a radio bearer setup complete message to the NB 5 (S514).

The procedure illustrated in FIG. 11 requires that the NB 5 knows all the configurations present in each package version. The NB 5 will send the UE 1 an explicit configuration for radio bearer setup if the NB does not know all the configurations present in each package version, such as where there is an obsolete configuration package.

The configuration package is a virtual concept, or a way to define all the configurations, and assigns a version number to a certain set of configurations. Any new configuration created by the operator must be added to the package stored on the device and the package version updated such that there is no need to download all the configurations of a package version when only one has changed or been added. FIG. 12 illustrates how the packages could be handled.

As illustrated in FIG. 12, the UE 1 has stored configuration package V1.0, which contains configurations A, B and C (S602). The network operator then necessitates a new configuration, such as configuration D instead of configuration C, informs the external server of the new configuration, and stores the new configuration on the external server in package V1.1 containing configuration A, B and D (S604).

The UE 1 downloads only configuration D to replace configuration C and updates the package version number to V1.1 when connecting to the external server to update its stored configurations (S606). The UE 1 need not update the configurations it already has, specifically configurations A and B. The UE 1 then stores configuration package V1.0 containing configurations A, B and D (S608).

Although FIG. 12 illustrates configuration D replacing configuration C, the invention is also applicable when a new configuration is added or deleted. For example, configuration D can also be added to the new package V1.1 such that the new package contains configurations A, B, C and D.

It is also possible that the new package version contains configurations that are completely different from previous version. For example, package V1.1 could have contained new configurations D, E, F and G.

One possible way to update the default configurations in the UE 1 is to use device management to create a management object (MO).

FIG. 13 illustrates using a management object to handle new configurations.

Two aspects of a roaming UE 1 are important. First, the visited PLMN configuration may be stored without deleting the home PLMN configurations. Second, the use of a management object necessitates the use of a special tag such that the fields corresponding to the visited PLMN configurations are accessible only by the DM server belonging to the home PLMN operator and the DM servers for other PLMN operators can only retrieve, modify, or add information in the field corresponding to the visited PLMN configurations.

Another alternative for the handling of configuration package is illustrated in FIGS. 14 and 15.

As illustrated in FIGS. 14 and 15, the information on the configurations present in a package version are transparent to the server such that the configurations are stored on the server as an octet stream that only the NB 5 and UE 1 are capable of decoding. There are two modes proposed.

FIG. 14 illustrates a fully transparent mode and FIG. 15 illustrates a half-transparent mode. As illustrated In FIG. 14, the configurations are stored on the server in the fully transparent mode as a transparent container or octet stream such that there is one octet stream per configuration package version.

A UE 1 that wants to update its stored configuration package must download the entire transparent container corresponding to the new package.

As illustrated In FIG. 15, the configurations are stored on the server in the half-transparent mode as an octet stream such that there is one octet steam per configuration. Only the UE and the NB 5 can decode the exact content of the configurations. However, the server knows the configuration ID. Therefore, a UE 1 that wants to update its stored configuration package will only have to download the octet streams corresponding to the changed or new configurations and update the package version number.

FIG. 16 illustrates a block diagram of a mobile station (MS) or UE 1. The UE 1 includes a processor (or digital signal processor) 610, RF module 635, power management module 605, antenna 640, battery 655, display 615, keypad 620, memory 630, SIM card 625 (which may be optional), speaker 645 and microphone 650.

A user enters instructional information, such as a telephone number, for example, by pushing the buttons of a keypad 620 or by voice activation using the microphone 650. The microprocessor 610 receives and processes the instructional information to perform the appropriate function, such as to dial the telephone number. Operational data may be retrieved from the Subscriber Identity Module (SIM) card 625 or the memory module 630 to perform the function. Furthermore, the processor 610 may display the instructional and operational information on the display 615 for the user's reference and convenience.

The processor 610 issues instructional information to the RF module 635, to initiate communication, for example, transmits radio signals comprising voice communication data. The RF module 635 comprises a receiver and a transmitter to receive and transmit radio signals. An antenna 640 facilitates the transmission and reception of radio signals. Upon receiving radio signals, the RF module 635 may forward and convert the signals to baseband frequency for processing by the processor 610. The processed signals would be transformed into audible or readable information outputted via the speaker 645, for example. The processor 610 also includes the protocols and functions necessary to perform the various processes described herein.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims.

Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

INDUSTRIAL APPLICABILITY

The present invention can be applied to the mobile communication system.

The invention claimed is:

1. A method of setting a radio bearer in a wireless communication system, the method comprising:
   storing a default set of radio bearer configuration parameters with an associated configuration identifier and a default package identifier;
   receiving a radio resource control (RRC) configuration package identifier through a broadcast channel;
   requesting an updated set of radio bearer configuration parameters with an associated configuration identifier and an updated package identifier;
   receiving at least one of the updated set of radio bearer configuration parameters with the associated configuration identifier and the updated package identifier;
   determining if the received RRC configuration package identifier is different from the default package identifier;
   storing the received at least one of the updated set of radio bearer configuration parameters with the associated configuration identifier and the updated package identifier as the default radio bearer configuration parameters with the associated configuration identifier and the default package identifier if it is determined that the received RRC configuration package identifier is different from the default package identifier;
   transmitting an RRC connection request to a base station using the default package identifier;
   receiving an RRC connection setup message comprising a configuration identifier or configuration parameters;
   transmitting an RRC connection setup complete message to the base station through a wireless connection established using parameters associated with the configuration identifier or the configuration parameters received in the RRC connection setup message.

2. The method of claim 1, wherein the radio bearer configuration parameters comprise at least one of radio link control (RLC) mode, packet data convergence protocol (PDCP) mode, or medium access control (MAC) configuration.

3. The method of claim 1, further comprising:
   transmitting a capability information message comprising the default package identifier to the base station while an RRC connection is established; and
   receiving a radio bearer setup message comprising a configuration identifier or a configuration parameter.

4. The method of claim 1, wherein the request for the updated set of radio bearer configuration parameters with the associated configuration identifier and the updated package identifier is made to an external server.

5. The method of claim 1, wherein the package identifier comprises a package version.

6. A method of setting a radio bearer in a wireless communication system, the method comprising:
   storing a first set of radio bearer configuration parameters with an associated configuration identifier and a default package identifier;
   detecting a non-home network;
   receiving an updated set of radio bearer configuration parameters with an associated configuration identifier and an updated package identifier;
   storing the updated set of radio bearer configuration parameters with the associated configuration identifier and the updated package identifier as a second set if the updated package identifier is different from the default package identifier in the first set;
   transmitting an RRC connection request to a base station using the default package identifier;
   receiving an RRC connection setup message comprising a configuration identifier or configuration parameters;
   transmitting an RRC connection setup complete message to the base station through a wireless connection established using parameters associated with the configuration identifier or the configuration parameters received in the RRC connection setup message.

7. The method of claim 6, wherein receiving the updated set of radio bearer configuration parameters with the associated configuration identifier and the updated package identifier comprises using an external server address received through a broadcast channel of the non-home network.

8. A mobile terminal for setting a radio bearer in a wireless communication system, the mobile terminal comprising:
- a transmitting/receiving unit transmitting and receiving signals to and from a base station;
- a display unit displaying user interface information;
- an input unit receiving inputs from a user;
- a storage unit for storing information; and
- a processing unit for:
  - controlling the storage unit to store a default set of radio bearer configuration parameters with an associated configuration identifier and a default package identifier;
  - processing a radio resource control (RRC) configuration package identifier received through a broadcast channel;
  - controlling the transmitting/receiving unit to request an updated set of radio bearer configuration parameters with an associated configuration identifier and an updated package identifier;
  - processing at least one of a received updated set of radio bearer configuration parameters with an associated configuration identifier or a received updated package identifier;
  - determining if the received RRC configuration package identifier is different from the default package identifier;
  - controlling the storage unit to store the received at least one of the updated set of radio bearer configuration parameters with the associated configuration identifier or the updated package identifier as the default radio bearer configuration parameters with the associated configuration identifier and the default package identifier if it is determined that the received RRC configuration package identifier is different from the default package identifier;
  - controlling the transmitting/receiving unit to transmit an RRC connection request to a base station using the default package identifier;
  - processing a received RRC connection setup message comprising a configuration identifier or configuration parameters; and
  - controlling the transmitting/receiving unit to transmit an RRC connection setup complete message to the base station through a wireless connection established using parameters associated with the configuration identifier or the configuration parameters received in the RRC connection setup message.

9. The mobile terminal of claim 8, wherein the radio bearer configuration parameters comprise at least one of radio link control (RLC) mode, packet data convergence protocol (PDCP) mode, or medium access control (MAC) configuration.

10. The mobile terminal of claim 8, wherein the processing unit further controls the transmitting/receiving unit to transmit a capability information message comprising the default package identifier to the base station while an RRC connection is established and processes a received radio bearer setup message comprising a configuration identifier or a configuration parameter.

11. The mobile terminal of claim 8, wherein the request for the updated set of radio bearer configuration parameters with the associated configuration identifier and the updated package identifier is made to an external server.

12. The mobile terminal of claim 8, wherein the package identifier comprises a package version.

13. A mobile terminal for setting a radio bearer in a wireless communication system, the mobile terminal comprising:
- a transmitting/receiving unit transmitting and receiving signals to and from a base station;
- a display unit displaying user interface information;
- an input unit receiving inputs from a user;
- a storage unit for storing information; and
- a processing unit for:
  - controlling the storage unit to store a first set of radio bearer configuration parameters with an associated configuration identifier and a default package identifier;
  - detecting a non-home network;
  - processing a received updated set of radio bearer configuration parameters with an associated configuration identifier and an updated package identifier;
  - controlling the storage unit to store the updated set of radio bearer configuration parameters with the associated configuration identifier and the updated package identifier as a second set if the updated package identifier is different from the default package identifier in the first set;
  - controlling the transmitting/receiving unit to transmit an RRC connection request to a base station using the default package identifier;
  - processing a received RRC connection setup message comprising a configuration identifier or configuration parameters;
  - controlling the transmitting/receiving unit to transmit an RRC connection setup complete message to the base station through a wireless connection established using parameters associated with the configuration identifier or the configuration parameters received in the RRC connection setup message.

14. The mobile terminal of claim 13, wherein processing the received updated set of radio bearer configuration parameters with the associated configuration identifier and the updated package identifier comprises using an external server address received through a broadcast channel of the non-home network.

* * * * *